No. 891,123. PATENTED JUNE 16, 1908.
J. C. WILKINS.
TROLLEY.
APPLICATION FILED OCT. 27, 1906.
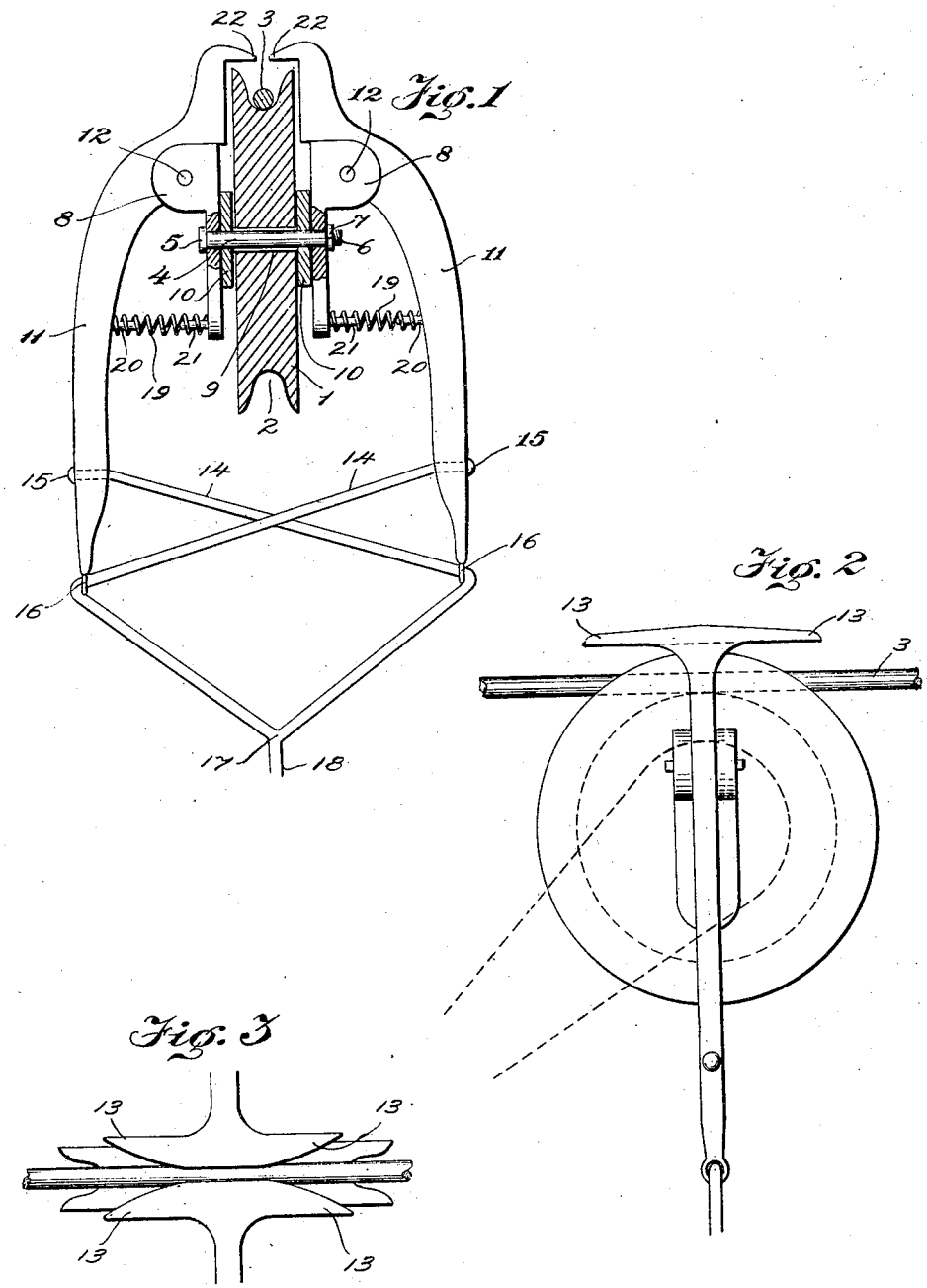
Inventor
John C. Wilkins
By Victor J. Evans
Attorney
Witnesses

UNITED STATES PATENT OFFICE.

JOHN C. WILKINS, OF SWISSVALE, PENNSYLVANIA.

TROLLEY.

No. 891,123.        Specification of Letters Patent.        Patented June 16, 1908.

Application filed October 27, 1906. Serial No. 340,912.

*To all whom it may concern:*

Be it known that I, JOHN C. WILKINS, a citizen of the United States of America, residing at Swissvale, in the county of Allegheny and State of Pennsylvania, have invented new and useful Improvements in Trolleys, of which the following is a specification.

This invention relates to trolleys and one of the principal objects of the same is to provide means for reliably and efficiently holding the trolley wheel engaged with the trolley wire and to prevent accidental displacement therefrom.

Another object of the invention is to provide simple and reliable means for disconnecting the trolley wheel from the wire by a downward pull upon the trolley rope.

These and other objects may be attained by means of the construction illustrated in the accompanying drawings, in which:

Figure 1 is a front elevation of a trolley made in accordance with my invention, and showing the trolley axle wheel bearing therefor in section. Fig. 2 is a side elevation of the same. Fig. 3 is a detail plan view looking down upon the trolley.

Referring to the drawing for a more particular description of my invention, the numeral 1 designates the trolley wheel which may be of the usual or any required configuration and provided with the usual circumferential groove 2 to accommodate the trolley wire 3. The axle 4 of the trolley wheel, is provided with a head 5 and an opposite threaded end 6 fitted with a nut 7. The axle 4 is supported in a pair of bearing plates 8.

The usual harp is shown by dotted line, Fig. 2, and the axle of bolt 4 passes through apertures in the arms 10 of the harp as shown in Fig. 1, and on the axle is a bushing 9 for the wheel 1. Supported on the ends of the axle 4 and disposed at opposite sides of the harp are bearing plates or members 8. A pair of levers 11 are pivotally connected at 12 to the bearing plates and the upper ends of said levers are elongated and provided with diverging end portions 13, as shown in Fig. 3 to ride easily over the trolley wire supporting devices. The levers 11 are extended downward from the pivotal points 12, and connected to said levers are a pair of operating ropes or cables 14, said cables having their terminal ends 15 secured in apertures in the levers 11 and extended in opposite directions through terminal eyes 16 formed on the ends of the said levers 11. The ropes or cables 14 are united at 17 to a single operating rope or cable 18. Springs 19 extend from studs 20 projecting inward from the levers 11 and from the studs 21 projecting outward from the bearing plate, said springs exerting their tension to close the jaws 22 over the trolley wire 3. The studs 20 are adapted to engage the studs 21 so as to limit the movement of the levers as they are released by the pulling of the rope 18. The bearing plates 8 are provided with spaced pintle bearing lugs through which the pivot pins 12 pass and the levers 11 are disposed between the spaced bearings, as shown more particularly in Fig. 2.

The operation of my invention may be briefly described as follows: When the rope 18 is drawn downward, the lower ends of the levers 11 are drawn together and the jaws 22 are separated so that the trolley wire 3 will readily be disconnected from the trolley wheels 1. When the trolley wheel is carried upward by means of its spring, the trolley wire 3 will ride upon the upper surfaces of jaws and force them apart sufficiently to engage the trolley wheel when a downward pull is exerted upon the rope 18, and when said rope is released, the jaws 22 approach each other and hold the trolley wire in place upon the trolley wheel, in an obvious manner.

From the foregoing it will be obvious that a trolley wheel made in accordance with my invention will hold the trolley wire in operative position and not permit the same to become readily detached therefrom, while by pulling downward upon the trolley rope, the trolley will be instantly released from the wire.

The present device for releasably holding the trolley wheel and wire together is designed more particularly as an attachment for trolley harps already in use, it being necessary merely to replace the axle or bolt ordinarily employed by one which is somewhat longer so that the members 8 of the attachment can be supported on the ends of the axle. It will thus be seen that no change in design of the harp is required to adapt the attachment thereto.

Having thus described the invention, what I claim is:

The combination of a trolley wheel, an axle therefor, means for supporting the axle, members pivotally mounted on the ends of the axle and supported entirely by the latter, levers pivoted on the members with their upper extremities normally disposed over the wheel for retaining the trolley wire on the latter, oppositely disposed studs on the lower ends of the members and levers, the studs on the latter being arranged to engage those on the members for limiting the movement of the levers, and helical compression springs arranged between each member and adjacent lever and supported at their ends by the said studs.

In testimony whereof I affix my signature in presence of two witnesses.

JOHN C. WILKINS.

Witnesses:
 T. F. HODGE,
 ROBT. C. SMITH.